US011039562B2

(12) United States Patent
Bourgault

(10) Patent No.: US 11,039,562 B2
(45) Date of Patent: Jun. 22, 2021

(54) IN-CROP WEED CLIPPING IMPLEMENT

(71) Applicant: F. P. Bourgault Tillage Tools Ltd., St. Brieux (CA)

(72) Inventor: Joseph Bourgault, St. Brieux (CA)

(73) Assignee: F.P. Bourgault Tillage Tools Ltd., St. Brieux (CA)

( * ) Notice: Subject to any disclaimer, the term of this patent is extended or adjusted under 35 U.S.C. 154(b) by 31 days.

(21) Appl. No.: 16/079,126

(22) PCT Filed: Feb. 26, 2016

(86) PCT No.: PCT/CA2016/000052
§ 371 (c)(1),
(2) Date: Aug. 23, 2018

(87) PCT Pub. No.: WO2017/143424
PCT Pub. Date: Aug. 31, 2017

(65) Prior Publication Data
US 2019/0059196 A1    Feb. 28, 2019

(51) Int. Cl.
*A01B 39/18* (2006.01)
*A01B 73/04* (2006.01)
(Continued)

(52) U.S. Cl.
CPC ............ *A01B 39/18* (2013.01); *A01B 39/085* (2013.01); *A01B 63/22* (2013.01); *A01B 73/046* (2013.01);
(Continued)

(58) Field of Classification Search
CPC ....... A01B 39/18; A01B 39/085; A01B 39/08; A01B 63/22; A01B 73/046; A01D 34/66;
(Continued)

(56) References Cited

U.S. PATENT DOCUMENTS 2,753,674 A * 7/1956 Cunningham, Jr. ........................ A01D 34/661
56/6
3,473,302 A * 10/1969 Caldwell .............. A01D 34/661
56/6
(Continued)

FOREIGN PATENT DOCUMENTS

| CA | 1249161 A | 1/1989 |
| DE | 3937110 A1 | 5/1991 |
| GB | 2523120 A | 8/2015 |

OTHER PUBLICATIONS

Brenda Frick, Aug. 1998, Saskatchewan Organic Directorate, Weed Management for Organic Producers, p. 18.*
(Continued)

*Primary Examiner* — Adam J Behrens
(74) *Attorney, Agent, or Firm* — Frost Brown Todd LLC; Nicole M. Tepe

(57) ABSTRACT

An implement for clipping weeds in a field, where the weeds are standing taller than the crop. The implement comprises a plurality of rotatable blades on a frame, with variable height adjustment means to elevate the frame and position the blades above the crop but at a level sufficient to clip the upper portions of the weeds, The blades are powered by PTO-driven shaft segments, the segments connected by U-joints, wherein the implement further comprises alignment means for aligning the U-joints so that the frame can be folded for transport without damaging the shafts or U-joints.

16 Claims, 11 Drawing Sheets

(51) Int. Cl.
| | | |
|---|---|---|
| *A01D 34/66* | (2006.01) | |
| *A01D 75/30* | (2006.01) | |
| *A01B 63/22* | (2006.01) | |
| *A01B 39/08* | (2006.01) | |
| *A01D 34/82* | (2006.01) | |
| *A01D 34/76* | (2006.01) | |
| *A01D 34/74* | (2006.01) | |
| *A01D 75/00* | (2006.01) | |

(52) U.S. Cl.
CPC .......... *A01D 34/66* (2013.01); *A01D 34/661* (2013.01); *A01D 34/74* (2013.01); *A01D 34/76* (2013.01); *A01D 34/828* (2013.01); *A01D 75/002* (2013.01); *A01D 75/306* (2013.01)

(58) Field of Classification Search
CPC ...... A01D 34/661; A01D 34/74; A01D 34/76; A01D 34/828; A01D 34/665; A01D 75/002; A01D 75/30–306; A01D 63/002
See application file for complete search history.

(56) References Cited

U.S. PATENT DOCUMENTS

| | | | | |
|---|---|---|---|---|
| 3,527,032 A | * | 9/1970 | Wood | A01D 34/661 56/6 |
| 4,133,391 A | | 1/1979 | Richardson et al. | |
| 4,619,330 A | * | 10/1986 | Machnee | A01B 73/046 172/311 |
| 5,069,022 A | * | 12/1991 | Vandermark | A01D 75/30 56/15.5 |
| 5,092,111 A | * | 3/1992 | Gleeson | A01B 73/005 56/13.6 |
| 5,113,640 A | * | 5/1992 | Colistro | A01D 34/66 56/13.6 |
| 5,732,540 A | * | 3/1998 | Samejima | A01D 34/66 56/16.7 |
| 6,381,934 B2 | * | 5/2002 | Heard | A01D 34/76 56/13.6 |
| 7,513,095 B2 | * | 4/2009 | Hofmann | A01B 73/046 56/13.6 |
| 8,220,240 B2 | * | 7/2012 | Tielburger | A01B 45/00 56/400.04 |
| 2002/0000081 A1 | * | 1/2002 | Heard | A01D 47/00 56/6 |
| 2007/0119139 A1 | * | 5/2007 | Hofmann | A01B 73/046 56/228 |

OTHER PUBLICATIONS

E. Johnson, 1999/2000, Scott Research Farm, Clipping Weeds Above a Crop Canopy.*
International Search Report and Written Opinion for International Application No. PCT/CA2016/00052, 11 pages.
Extended European Search Report dated Oct. 7, 2019 for Application No. 16890914.1, 8 pages.

* cited by examiner

IN-CROP WEED CLIPPING IMPLEMENT

CROSS-REFERENCE TO RELATED APPLICATION

This application claims priority to and benefit of International Application No. PCT/CA2016/000052, entitled "IN-CROP WEED CLIPPING IMPLEMENT," filed Feb. 26, 2016, the contents of which are incorporated by reference in its entirety for all purposes.

FIELD OF THE INVENTION

The present invention relates to weed control in an agricultural field, and more specifically to non-chemical weed control techniques.

BACKGROUND OF THE INVENTION

It is well known in the art of agricultural crop production that weeds standing taller than the crop represent a significant problem for farmers. Such weeds compete with the desired crop plants for space, nutrients, sunlight and moisture, resulting in reduced yields and productivity and impaired crop quality.

In early agricultural practices weeds were removed by preventive methods such as harrowing and rod weeding, but as farming operations grew in size the need for a different solution became evident. It has become conventional to apply one or more chemical additive treatments to a standing crop, to selectively kill the weeds while leaving the standing crop alive. This practice has become widespread and the standard practice in many countries, with technology development focused on new and more effective weed control chemicals for use with various crop types.

However, it is known that weeds can sometimes survive a chemical treatment program, and depending on the chemical and crop type it may not be desirable or possible to re-apply the chemical treatment. Also, some crops are especially sensitive to chemicals, such as some varieties of lentils, which makes chemical application undesirable in the first place.

In addition, some farmers and consumers do not want chemical additives to be used on crops, seeing them as a potential health hazard, which has given rise to a growing organic farming industry. In such cases the problem of weed control is even more critical, and potential reasonable solutions are highly limited.

What is needed, therefore, is a means to control weeds in a standing crop without the use of chemical additives, and preferably allow for re-application of such means throughout the growing season as necessary.

SUMMARY OF THE INVENTION

The present invention therefore seeks to provide an implement and method for countering weed growth in a crop without reliance on chemical treatment of the field.

According to a first broad aspect of the present invention there is provided an agricultural implement for clipping weeds in a field containing a crop, the crop having an average crop height, the implement comprising:
  a frame;
  a plurality of rotatable blades mounted on the frame for clipping the weeds;
  drive means for rotating the plurality of rotatable blades; and
  a plurality of wheels connected to the frame by variable height adjustment means, the wheels for use in moving the implement in the field;
  the variable height adjustment means configured to selectively raise or lower the frame relative to the plurality of wheels to position the plurality of rotatable blades at a height sufficient to clip the weeds above the average crop height.

In some exemplary embodiments, each of the plurality of rotatable blades is a mower blade depending beneath the frame; where this is the case some exemplary embodiments may further comprise a plurality of generally vertical tines spaced along either or both of a leading edge and a trailing edge of the frame, the tines extending downwardly from the frame to a level lower than the mower blades. The drive means may comprise a power take-off output from a tractor, the tractor used to pull the implement through the field. The drive means may also comprise at least one gearbox, the at least one gearbox connected to at least one of the plurality of rotatable blades by means of a belt, such that actuation of the gearbox causes the belt to rotate the at least one of the plurality of rotatable blades for clipping the weeds. The front wheels are preferably castor wheels.

The frame preferably comprises a series of laterally aligned frame members, each of the frame members hingedly connected to adjacent frame members, and the implement may further comprise at least one power cylinder connecting adjacent frame members and operable to rotate the adjacent frame members relative to each other.

In some embodiments the frame comprises a central frame member, and the drive means comprise a primary gearbox situated on the central frame member and a secondary gearbox situated on each of the frame members immediately adjacent the central frame member, the primary gearbox operably connected to each secondary gearbox by a respective shaft to actuate each secondary gearbox and each secondary gearbox connected by means of a belt to the at least one rotatable blade mounted on the respective frame member, such that actuation of the secondary gearbox causes the belt to rotate the at least one rotatable blade for clipping the weeds.

In some embodiments the frame comprises a central frame member, and the drive means comprise a primary gearbox situated on the central frame member and a secondary gearbox situated on each of the frame members immediately adjacent the central frame member, the primary gearbox operably connected to each secondary gearbox to actuate each secondary gearbox by a respective inner shaft and outer shaft, the inner and outer shafts connected by a universal joint at a hinge line between the central frame member and each of the adjacent frame members, each secondary gearbox connected by means of a belt to the at least one rotatable blade mounted on the respective frame member, such that actuation of the secondary gearbox causes the belt to rotate the at least one rotatable blade for clipping the weeds, and each of the universal joints is timed to allow rotation of the adjacent frame members relative to each other.

In some embodiments the frame comprises a central frame member, a lateral frame member on each side of the central frame member, and a peripheral frame member on a side of each lateral frame member opposite to the central frame member, and the drive means comprise a primary gearbox situated on the central frame member and a secondary gearbox situated on each of the lateral frame members and the peripheral frame members. The primary gearbox is then operably connected by a shaft to each secondary gearbox on the lateral frame members to actuate each secondary gearbox on the lateral frame members, each secondary gearbox on the lateral frame members is operably connected by a shaft to the secondary gearbox on the adjacent peripheral frame member to actuate each secondary gearbox on the peripheral frame members, each shaft comprises an inner shaft and an outer shaft, the inner and outer shafts connected by a universal joint at a hinge line between adjacent frame members, and each of the universal joints is timed to allow rotation of the adjacent frame members relative to each other.

In some exemplary embodiments the variable height adjustment means comprise power cylinders for selectively rotating the wheels away from or toward the frame to respectively raise or lower the frame relative to the wheels to position the plurality of rotatable blades at a height sufficient to clip the weeds above the average crop height. The implement may further comprise a pivot framework to maintain the frame generally parallel to the ground at a selected height.

According to a second broad aspect of the present invention there is provided a foldable agricultural implement for in-crop weed clipping, the implement comprising:

a frame comprising at least first and second frame members, the first and second frame members hingedly connected for relative rotation between a first weed-clipping position wherein the first and second frame members are generally horizontal and a second transport position wherein the second frame member is rotated upwardly and out of horizontal;

at least one rotatable blade mounted on each of the frame members for clipping weeds; drive means for rotating the rotatable blades; and a plurality of ground-engaging wheels connected to the frame by variable height adjustment means, the variable height adjustment means configured to selectively raise or lower the frame relative to the plurality of wheels to position the rotatable blades at a height sufficient to clip the weeds above an average crop height.

The ability to fold up one or more sides of the implement provides an advantage where an operator desires to narrow the width of the implement for transport or storage, and particularly in cases where an implement is to be transported a long distance between fields.

In some exemplary embodiments, a third frame member is hingedly connected to the first frame member on a side opposite to the second frame member, the first and third frame members hingedly connected for relative rotation between a first weed-clipping position wherein the first and third frame members are generally horizontal and a second transport position wherein the third frame member is rotated upwardly and out of horizontal. The implement may further comprise fourth and fifth frame members, the fourth frame member hingedly connected to the second frame member on a side opposite to the first frame member, the second and fourth frame members hingedly connected for relative rotation between a first weed-clipping position wherein the second and fourth frame members are generally horizontal and a second transport position wherein the fourth frame member is rotated upwardly and out of horizontal, and the fifth frame member hingedly connected to the third frame member on a side opposite to the first frame member, the third and fifth frame members hingedly connected for relative rotation between a first weed-clipping position wherein the third and fifth frame members are generally horizontal and a second transport position wherein the fifth frame member is rotated upwardly and out of horizontal.

Exemplary embodiments may further comprise at least one power cylinder connecting adjacent frame members and operable to rotate the adjacent frame members relative to each other. Each of the rotatable blades is preferably a mower blade depending beneath the frame. The drive means preferably comprise a power take-off output from a tractor, the tractor used to pull the implement through a field. The drive means may also comprise at least one gearbox, the at least one gearbox connected to at least one of the plurality of rotatable blades by means of a belt, such that actuation of the gearbox causes the belt to rotate the at least one of the plurality of rotatable blades for clipping the weeds. The front wheels are preferably castor wheels.

In some embodiments, the drive means comprise a primary gearbox situated on the first frame member and a secondary gearbox situated on the second frame member, the primary gearbox operably connected to the secondary gearbox by a shaft to actuate the secondary gearbox, and the secondary gearbox connected by means of a belt to the at least one rotatable blade mounted on the second frame member, such that actuation of the secondary gearbox causes the belt to rotate the at least one rotatable blade for clipping the weeds.

In some embodiments, the drive means comprise a primary gearbox situated on the first frame member and a secondary gearbox situated on the second frame member, the primary gearbox operably connected to the secondary gearbox by an inner shaft and outer shaft to actuate the secondary gearbox, the inner and outer shafts connected by a universal joint at a hinge line between the first frame member and the second frame member, the secondary gearbox connected by means of a belt to the at least one rotatable blade mounted on the second frame member, such that actuation of the secondary gearbox causes the belt to rotate the at least one rotatable blade for clipping the weeds, and the universal joint is timed to allow rotation of the first and second frame members relative to each other.

In embodiments with a third frame member, the third frame member may be provided with a secondary gearbox operably connected by a shaft to the primary gearbox of the first frame member to actuate the secondary gearbox of the third frame member, and the secondary gearbox of the third frame member may be connected by means of a belt to the at least one rotatable blade mounted on the third frame member, such that actuation of the secondary gearbox of the third frame member causes the belt to rotate the at least one rotatable blade for clipping the weeds. In some cases, the shaft may comprise an inner shaft and outer shaft, the inner and outer shafts connected by a universal joint at a hinge line between the first frame member and the third frame member, and the universal joint is timed to allow rotation of the first and third frame members relative to each other.

In embodiments with a fourth and fifth frame member, the fourth frame member may be provided with a secondary gearbox operably connected by a shaft to the secondary gearbox of the second frame member to actuate the secondary gearbox of the fourth frame member, the secondary gearbox of the fourth frame member connected by means of a belt to the at least one rotatable blade mounted on the fourth frame member, such that actuation of the secondary gearbox of the fourth frame member causes the belt to rotate the at least one rotatable blade for clipping the weeds, while the fifth frame member may be provided with a secondary gearbox operably connected by a shaft to the secondary gearbox of the third frame member to actuate the secondary gearbox of the fifth frame member, and the secondary gearbox of the fifth frame member is connected by means of a belt to the at least one rotatable blade mounted on the fifth frame member, such that actuation of the secondary gearbox of the third frame member causes the belt to rotate the at least one rotatable blade for clipping the weeds. Each of the shafts may comprise an inner shaft and outer shaft, the inner and outer shafts connected by a universal joint at a hinge line between the adjacent frame members, and the universal joint is timed to allow rotation of the adjacent frame members relative to each other.

The variable height adjustment means may comprise power cylinders for selectively rotating the wheels away from or toward the frame to respectively raise or lower the frame relative to the wheels to position the plurality of rotatable blades at a height sufficient to clip the weeds above the average crop height. The implement may further comprise a pivot framework to maintain the frame generally parallel at a selected height.

According to a third broad aspect of the present invention there is provided a method for weed control in a standing crop, the method comprising the steps of:
 a. providing a movable frame comprising:
  a plurality of cutting members configured for clipping weeds; and
  a plurality of ground-engaging wheels having an adjustable distance from the frame;
 b. determining an average crop height level and an average weed height level for the standing crop;
 c. where the average weed height level is greater than the average crop height level, adjusting the distance between the wheels and the frame such that the cutting members are at a height between the average crop height level and the average weed height level;
 d. actuating the cutting members; and
 e. moving the frame through the standing crop, allowing the cutting members to cut off tops of the weeds.

In some exemplary embodiments, the method comprises repeating steps b. through e. at a plurality of times throughout a growing season of the standing crop.

The movable frame may be pulled by a tractor through the standing crop and a power take-off of the tractor can then be used to drive the cutting members, in which case actuating the cutting members may comprise providing at least one gearbox on the frame, the gearbox connected to the power take-off by means of a shaft, and connecting the gearbox by a belt to the cutting members, such that actuation of the gearbox by the power take-off causes the belt to rotate the cutting members to cut off the tops of the weeds.

In some embodiments the frame may comprise a central frame member and a lateral frame member, the central frame member and the lateral frame member hingedly connected for relative rotation, the method comprising the further steps after step e. of rotating the lateral frame member upwardly and out of horizontal, and transporting the frame away from the standing crop. Where the frame comprises a central frame member and two lateral frame members hingedly connected to opposite sides of the central frame member for relative rotation, the method may comprise the further steps after step e. of rotating the lateral frame members upwardly and out of horizontal, and transporting the frame away from the standing crop.

Adjusting the distance between the wheels and the frame is preferably achieved by using power cylinders to rotate the wheels toward or away from the frame, and most preferably hydraulic cylinders for use with a tractor's hydraulic system.

Exemplary methods preferably further comprise the step of maintaining the frame generally parallel to the ground during the step of adjusting the distance between the wheels and the frame.

According to a fourth broad aspect of the present invention there is provided a method for in-crop weed clipping comprising the steps of:
 a. providing a movable frame comprising:
  a plurality of cutting members; and
  a plurality of ground-engaging wheels having an adjustable distance from the frame;
 b. determining an average crop height level and an average weed height level for a field containing both a crop and weeds;
 c. where the average weed height level is greater than the average crop height level, adjusting the distance between the wheels and the frame such that the cutting members are at a height between the average crop height level and the average weed height level;
 d. actuating the cutting members; and
 e. moving the frame through the field, allowing the cutting members to cut off tops of the weeds.

In some exemplary embodiments, the method comprises repeating steps b. through e. at a plurality of times throughout a growing season of the crop.

The movable frame is preferably pulled by a tractor through the crop and a power take-off of the tractor is used to drive the cutting members. In that case, actuating the cutting members comprises providing at least one gearbox on the frame, the gearbox connected to the power take-off by means of a shaft, and connecting the gearbox by a belt to the cutting members, such that actuation of the gearbox by the power take-off causes the belt to rotate the cutting members to cut off the tops of the weeds.

In some embodiments, the frame comprises a central frame member and a lateral frame member, the central frame member and the lateral frame member hingedly connected for relative rotation, the method then comprising the further steps after step e. of rotating the lateral frame member upwardly and out of horizontal, and transporting the frame away from the crop.

In some embodiments, the frame comprises a central frame member and two lateral frame members hingedly connected to opposite sides of the central frame member for relative rotation, the method comprising the further steps after step e. of rotating the lateral frame members upwardly and out of horizontal, and transporting the frame away from the crop.

Adjusting the distance between the wheels and the frame is preferably achieved by using power cylinders to rotate the wheels toward or away from the frame, and most preferably hydraulic cylinders for use with a tractor's hydraulic system.

Exemplary methods preferably further comprise the step of maintaining the frame generally parallel to the ground during the step of adjusting the distance between the wheels and the frame.

According to a fifth broad aspect of the present invention there is provided a foldable drive system for an agricultural implement, the implement comprising a frame comprising at least first and second frame members, the first and second frame members hingedly connected for relative rotation at a hinge line, the second frame member rotatable between a first position generally parallel to the first frame member and a second position wherein the second frame member is rotated upwardly and out of parallel with the first frame member, the foldable drive system comprising:

a drive shaft extending across the hinge line; and
the drive shaft bisected at the hinge line by a universal joint;
the universal joint to allow rotation of the drive shaft when the second frame member is in the first position, and to allow folding of the drive shaft at the hinge line when the second frame member is rotated to the second position.

In some exemplary embodiments the system further comprises:
a third frame member hingedly connected to the first frame member on a side opposite to the second frame member, the first and third frame members hingedly connected for relative rotation at a second hinge line, the third frame member rotatable between a first position generally parallel to the first frame member and a second position wherein the third frame member is rotated upwardly and out of parallel with the first frame member;
a second drive shaft extending across the second hinge line; and
the second drive shaft bisected at the second hinge line by a second universal joint;
the second universal joint to allow rotation of the second drive shaft when the third frame member is in the first position, and to allow folding of the second drive shaft at the second hinge line when the third frame member is rotated to the second position.

In some further exemplary embodiments having a third frame member, the system further comprises:
a fourth frame member hingedly connected to the second frame member on a side opposite to the first frame member, the second and fourth frame members hingedly connected for relative rotation at a third hinge line, the fourth frame member rotatable between a first position generally parallel to the second frame member and a second position wherein the fourth frame member is rotated upwardly and out of parallel with the second frame member;
a third drive shaft extending across the third hinge line;
the third drive shaft bisected at the third hinge line by a third universal joint;
the third universal joint to allow rotation of the third drive shaft when the fourth frame member is in the first position, and to allow folding of the third drive shaft at the third hinge line when the fourth frame member is rotated to the second position;
a fifth frame member hingedly connected to the third frame member on a side opposite to the first frame member, the third and fifth frame members hingedly connected for relative rotation at a fourth hinge line, the fifth frame member rotatable between a first position generally parallel to the third frame member and a second position wherein the fifth frame member is rotated upwardly and out of parallel with the third frame member;
a fourth drive shaft extending across the fourth hinge line; and
the fourth drive shaft bisected at the fourth hinge line by a fourth universal joint;
the fourth universal joint to allow rotation of the fourth drive shaft when the fifth frame member is in the first position, and to allow folding of the fourth drive shaft at the fourth hinge line when the fifth frame member is rotated to the second position.

Exemplary foldable drive systems may further comprise at least one power cylinder connecting adjacent frame members and operable to rotate the adjacent frame members relative to each other. The universal joints are preferably timed to allow synchronized folding at their respective hinge lines, and most preferably include adjustment means to rotate the timed universal joints to an orientation allowing synchronized folding at their respective hinge lines.

A detailed description of an exemplary embodiment of the present invention is given in the following. It is to be understood, however, that the invention is not to be construed as being limited to this embodiment.

BRIEF DESCRIPTION OF THE FIGURES

In the accompanying Figures, which illustrate an exemplary embodiment of the present invention.

The exemplary embodiment of the present invention will now be described with reference to the accompanying Figures.

DETAILED DESCRIPTION OF EXEMPLARY EMBODIMENT

Throughout the following description specific details are set forth in order to provide a more thorough understanding to persons skilled in the art. However, well known elements may not have been shown or described in detail to avoid unnecessarily obscuring the disclosure. The following description of an example of the invention is not intended to be exhaustive or to limit the invention to the precise forms of any exemplary embodiment. Accordingly, the description and drawings are to be regarded in an illustrative, rather than a restrictive, sense.

In addition to the drawings, photographs of a prototype implement have been included as FIGS. 4a through 9b and 10b through 10d to further illustrate the exemplary embodiment. The prototype implement is approximately 50 feet in width (in unfolded orientation), with a maximum horsepower of 165 at the PTO (which equates to approximately 7 horsepower at each cutting head). The prototype is designed to lower to 3 inches above the ground, and can be raised to a maximum of 50 inches above the ground. A lower height could, for example, be used with appropriate cutting blades for clipping weeds in summer fallow or for mulching a low-height crop such as clover or peas for use as so-called "green manure". It would obviously be possible to design and manufacture other embodiments of the present invention with different specifications, based on the within teaching.

As indicated above, the present invention is directed to an implement and method for clipping the tops of weeds in a field having a standing crop, where the weeds have grown to a height greater than that of the crop. The implement comprises a plurality of cutting blades rotatably mounted on a frame, and the blades can be set to various desired levels using a variable height adjustment mechanism, which will be described in the exemplary embodiment below. In the exemplary embodiment, the frame comprises five laterally aligned frame members: a central frame member, right and left lateral frame members, and right and left peripheral frame members. Each of the frame members is the mounting point for five cutting blades. The peripheral and lateral frame members can be folded upwardly and toward the implement centre line for transport and/or storage of the implement. As the cutting blades are powered by shafts extending laterally across the implement, the shafts are divided by U-joints located at frame hinge lines, and the U-joints are timed so that a single point of adjustment can ensure that all U-joints are rotated to a position allowing folding of the frame members without damaging the U-joints or shafts.

Figure 1:
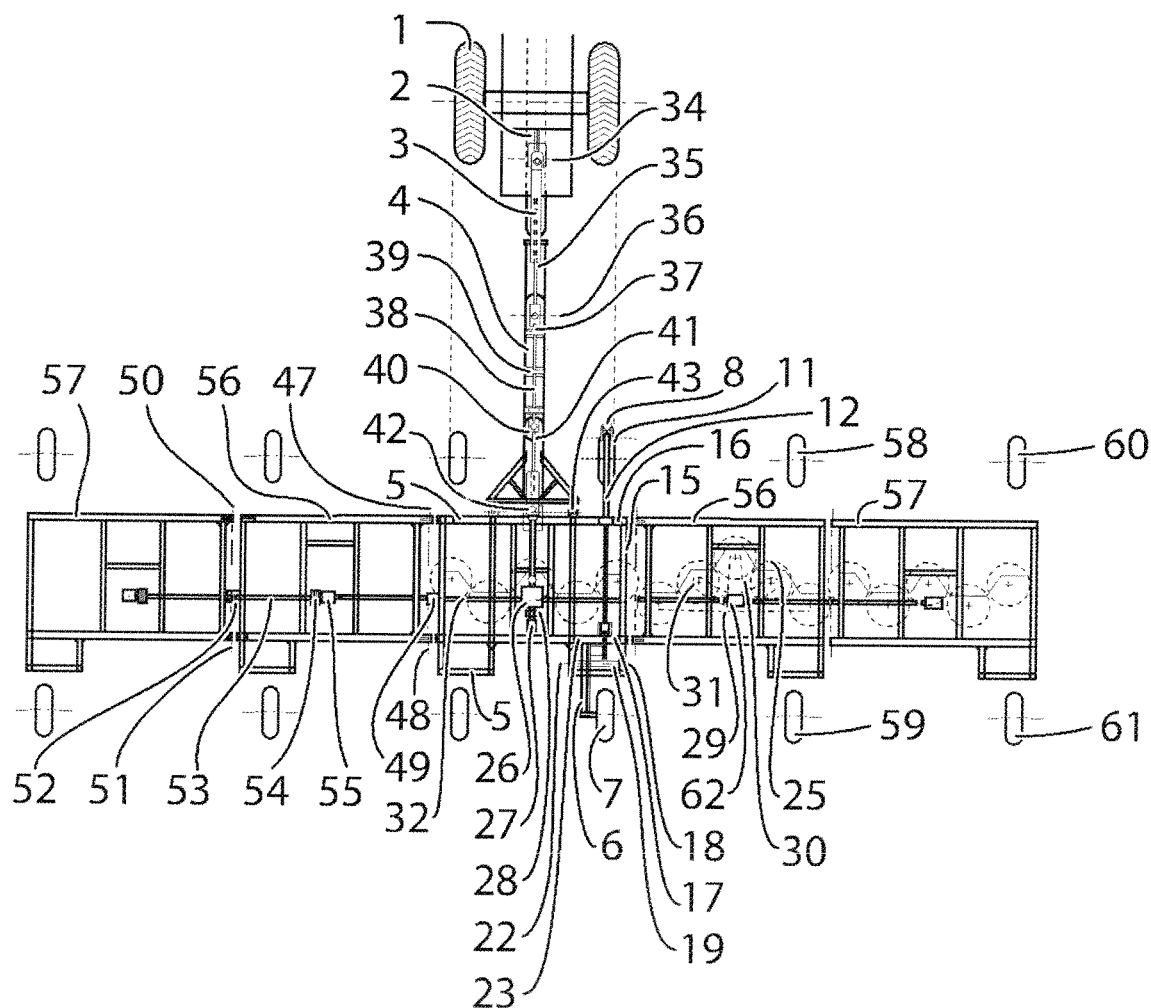
FIG. 1 is a top plan view of the exemplary embodiment of the present invention.
Figure 2:
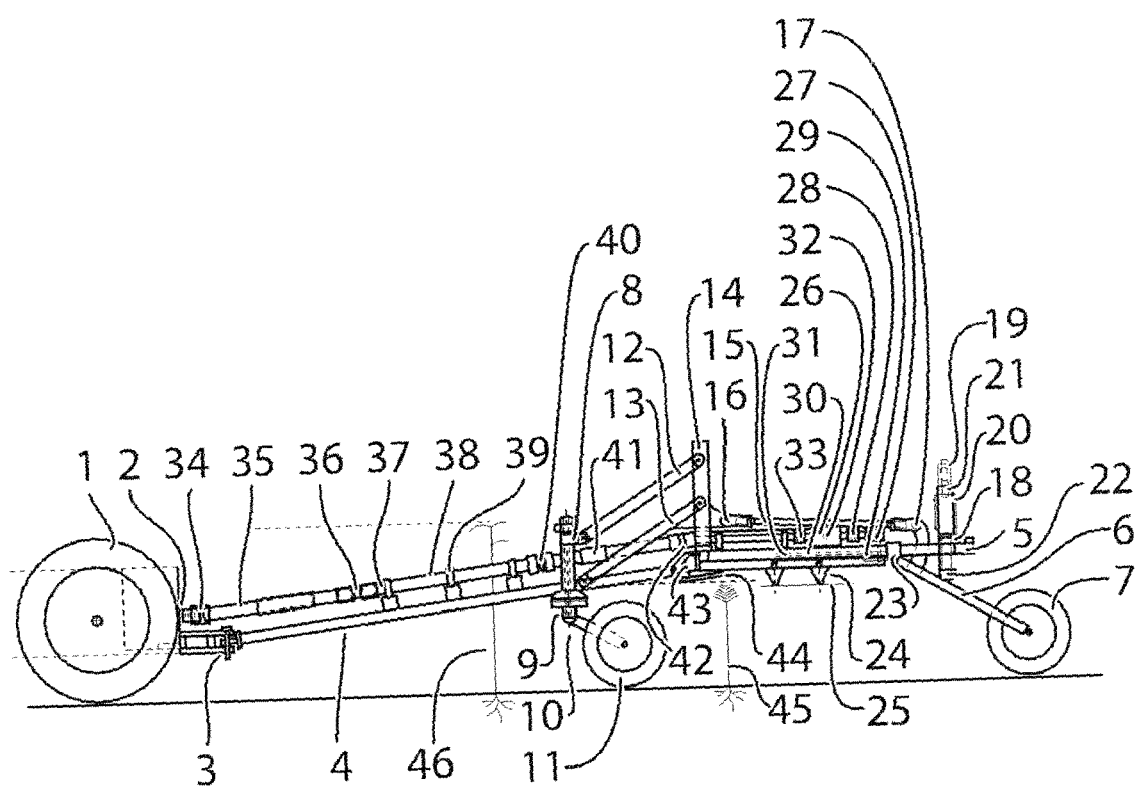
FIG. 2 is a side elevation view of the exemplary embodiment.

Turning now to FIGS. 1 and 2, the exemplary embodiment of the present invention is illustrated. The implement is designed to be pulled and powered by a conventional tractor, the tractor wheels 1, PTO 2 and hitch pin/pivot 3 shown in the Figures. The hitch pin/pivot 3 is connected to the main frame assembly 5 by means of a hitch beam 4 at a main hitch pivot 43, adjacent to which is a leaf spring 44 to help prevent rearward tipping of the frame 5. The hitch beam 4 is 13 feet long, composed of 4 inch×8 inch tubing. The tractor's hydraulic system is used to power the raising and lowering of the frame 5, as is described below.

A central feature of the present invention is the ability to raise and lower the cutting blades to desired heights dictated by the relative heights of the standing crop and the weeds. For example, FIG. 2 shows the cutting blades being raised to a level that clears the wheat crop 45 but would cut off the tops of the weeds 46 (which could, for example, be wild oats). Raising and lowering of the cutting blades is achieved by allowing a variable vertical distance between the frame and the ground-engaging wheels—increasing the distance raises the cutting blades relative to the ground level, while reducing the distance lowers the cutting blades relative to the ground level. Variable height could be achieved by various means known to those skilled in the art, e.g. simple hydraulic lifts at each wheel. In the exemplary embodiment, variable height adjustment is tied to a parallel lift system, which helps to maintain the frame—and the cutting blades—horizontally disposed during operation. A parallel lift system similar in form and function to that of the exemplary embodiment is described in detail in Canadian Patent No. 1,249,161 owned by Bourgault Industries Ltd., although the patented system is for a tillage implement and the variable height adjustment is for penetration depth of earth-working tools.

Figure 3:
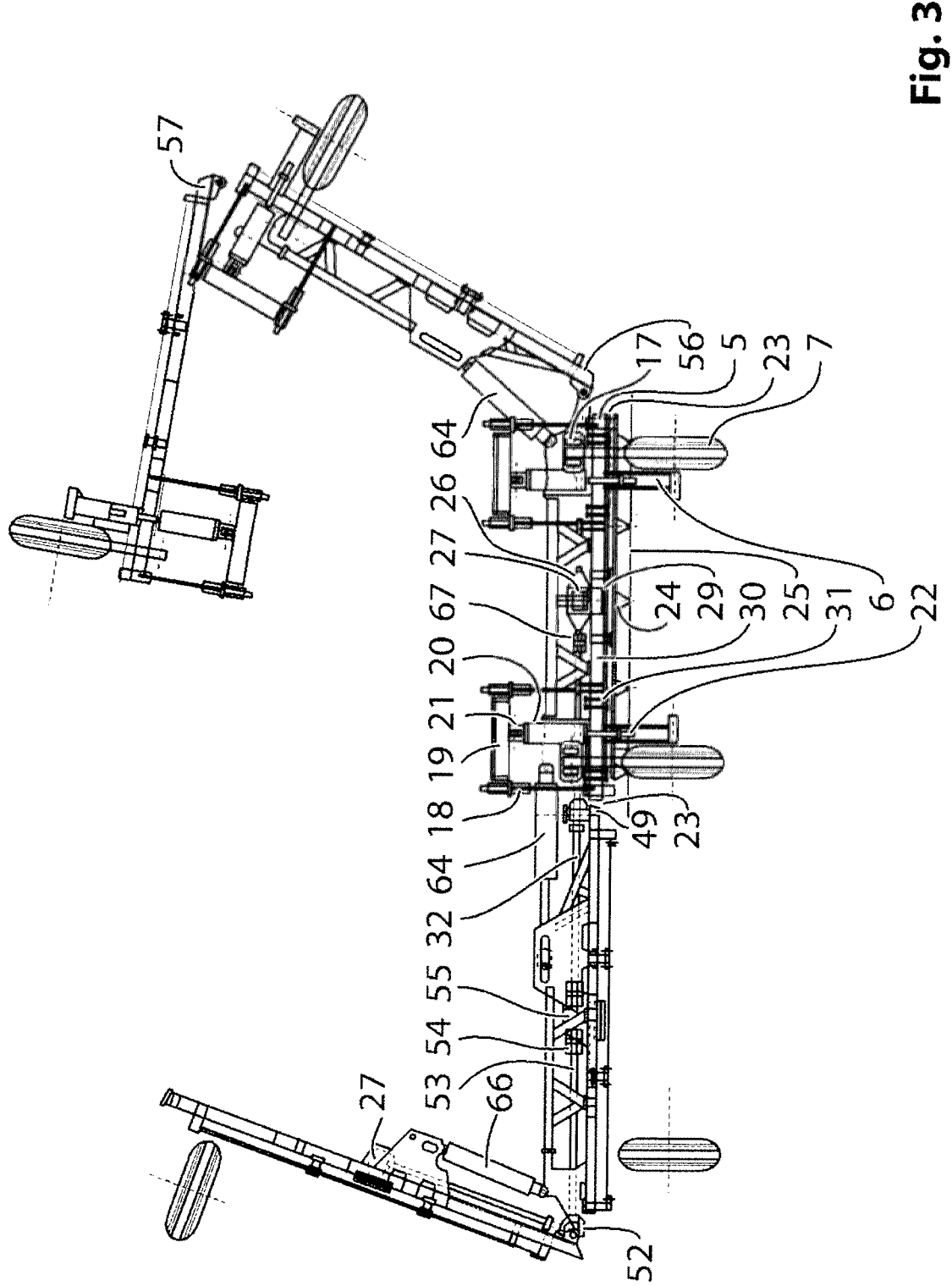
FIG. 3 is a rear elevation view of the exemplary embodiment.

The variable height adjustment means are best shown in FIG. 2. Note that FIG. 2 shows only the left peripheral height adjustment means, and that equivalent height adjustment means are provided at other wheel connection points across the implement as shown in FIGS. 1 and 3, for a total of six points (two on the central frame member, one at the outer edge of each of the other frame members).

A ground-engaging rear wheel (tire and rim) 7 is rotatably mounted on a rear axle 6. Wheels 59 and 61 are likewise connected to the frame 5, though shown without connecting components so as not to obscure the drawing. Wheels 7, 59 and 61 (on both sides of the implement) are fixed-axle wheels to avoid skewing or sidetracking of the implement, especially on hilly land. The rear axle 6 is connected at an opposite end to the frame 5 at an upper pivot 23. An hydraulic cylinder 20 (having an upper pivot axis 21) is mounted to the frame 5 using a mounting bracket 19 via a leveling screw 18. The cylinder 20 raises and lowers the rear axle (as described below) to control frame 5 height adjustment. The cylinder 20 is powered by the hydraulic system of the tractor, and one skilled in the art would be able to arrange a conventional means to power the cylinder 20 accordingly. As hydraulic cylinders 20 are present for each wheel-frame connection across the width of the implement, it is preferable to have all hydraulic cylinders 20 connected in series for simultaneous actuation.

The lower pivot 22 of the cylinder 20 connects to the rear axle 6 to rotate the rear axle 6 toward or away from the horizontal, thus respectively reducing or increasing the vertical distance between the frame 5 and the ground-engaging wheel 7.

The rear axle 6 is also pivotably connected to a connector shaft 15 at a rear pivot 17. The connector shaft 15 is a linkage that connects the rear axle 6 to a front axle 13 at a front pivot 16 to provide power to rotate the front axle 13. As the cylinder 20 extends and forces the rear axle 6 to rotate downwardly out of the horizontal, the connector shaft 15 moves rearwardly, which causes the front axle 13 to rotate away from the horizontal.

Turning to the front axle assembly, a rear end of the front axle 13 is pivotably mounted to a mounting bracket 14. An upper arm 12 also has a rear end pivotably mounted to the mounting bracket 14. The mounting bracket 14 is connected to an upper surface of the frame 5 at a forward edge of the frame 5. The forward ends of the front axle 13 and upper arm 12 are pivotably connected to a castor wheel pivot bracket 8, which pivot bracket 8 is connected to a castor wheel arm 9. The castor wheel arm 9 is for receiving a castor wheel 11, and the arm 9 is pivotably connected at axis 10 to the bracket 8 for pivoting of the castor wheel 11. Castor wheels 58 and 60 are likewise connected to the frame 5, though shown without connecting components so as not to obscure the drawing. Wheels 11, 58 and 60 (on both sides of the implement) are castor wheels to avoid side-loading the wheels, rims and axles when turning the implement. The front 11, 58, 60 and rear 7, 59, 61 wheels are aligned to reduce potential impact on the standing crop through which the implement passes.

Figure 6A:
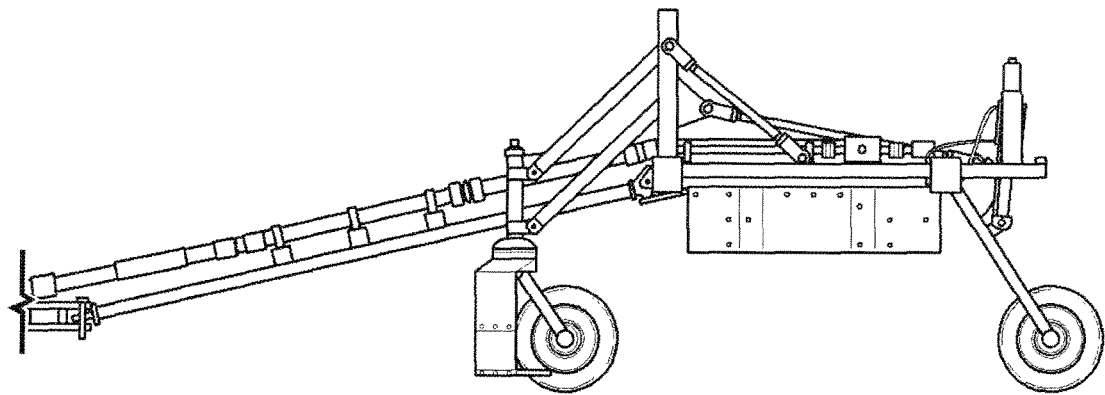
FIG. 6a is a photograph of the exemplary embodiment with the frame in a raised position.
Figure 6B:
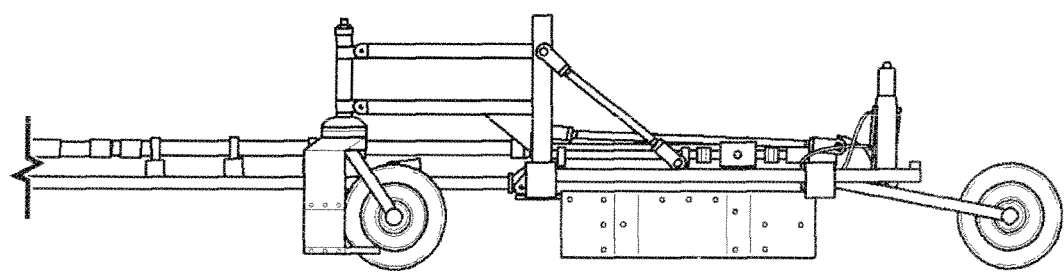
FIG. 6b is a photograph of the exemplary embodiment with the frame in a lowered position.
Figure 7:
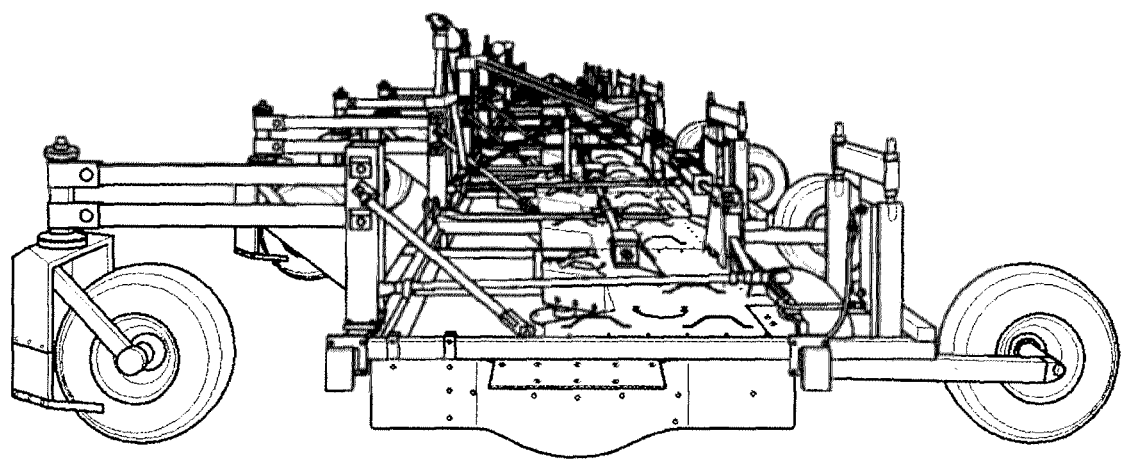
FIG. 7 is a photograph showing a top perspective view of the exemplary embodiment.

FIGS. 6a and 6b are photographs of a prototype showing the implement in raised (FIG. 6a) and lowered (FIG. 6b) positions. FIG. 7 provides a top perspective view of the prototype that clearly shows the connector shaft 15 and its connection to the front and rear axles 13, 6.

In the exemplary embodiment, means are provided to prevent hydraulic fluid flow back to the tractor once the desired frame 5 height has been achieved.

As indicated above, the above description of the variable height adjustment means applies to the wheel-frame connection points across the width of the implement, six points in total.

Figure 9A:
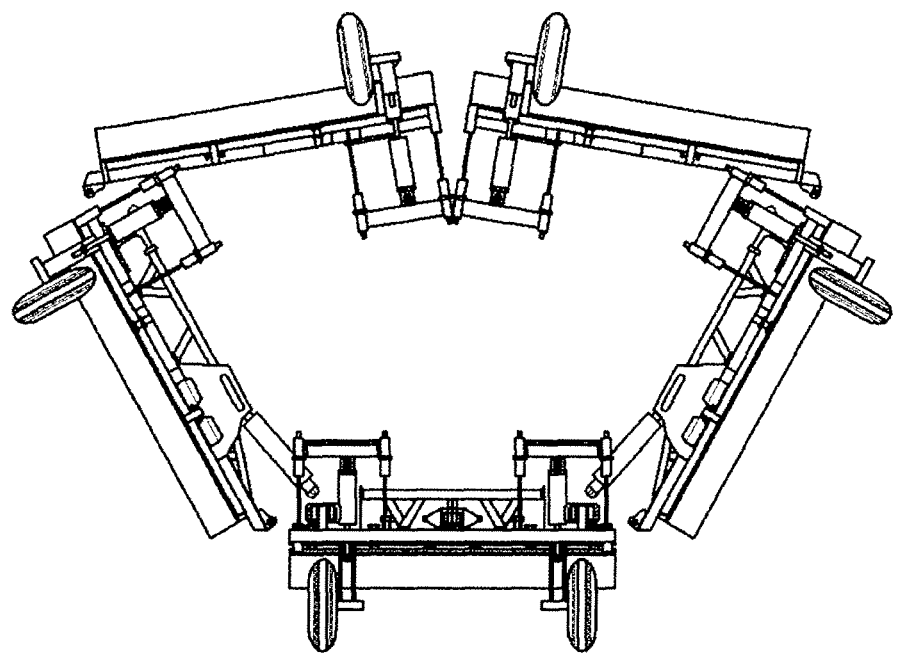
FIGS. 9a and 9b are photographs showing rear and front perspective views, respectively, of the exemplary embodiment when the side frame members are in a folded orientation.
Figure 10A:
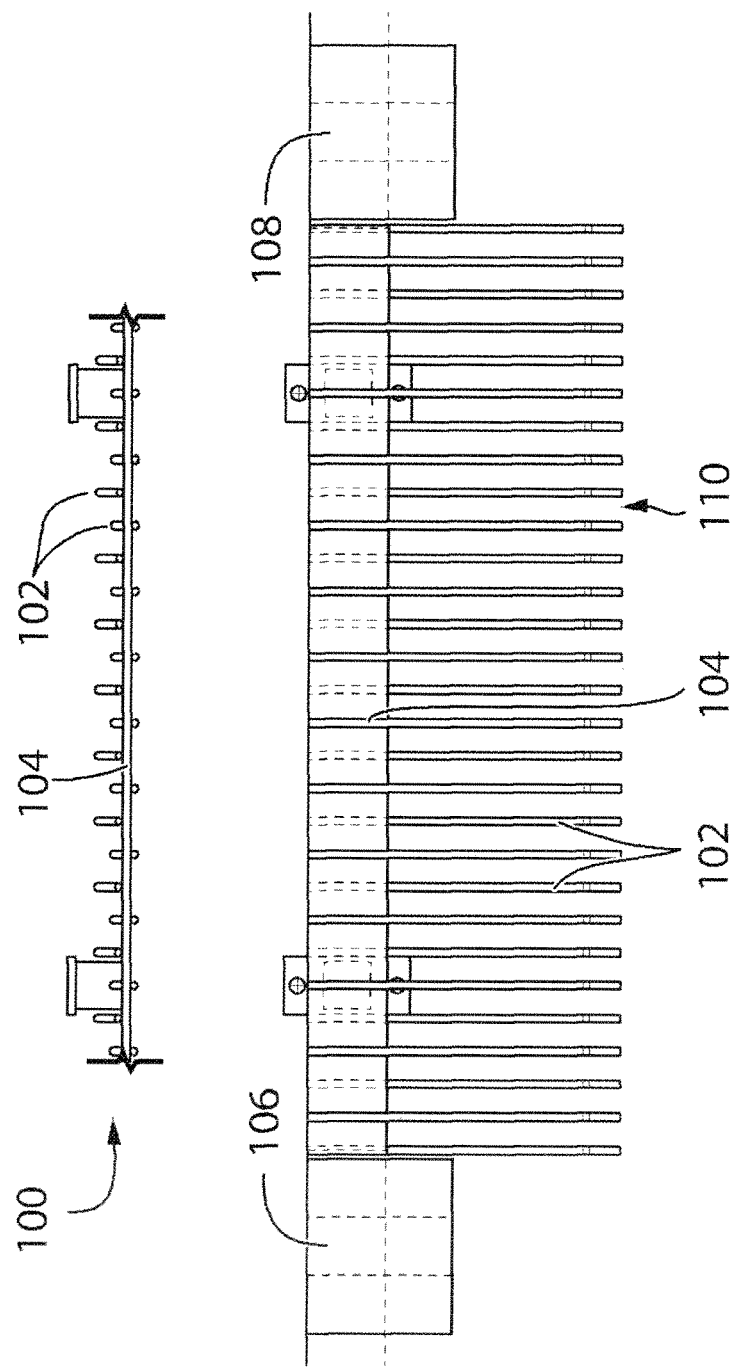
FIGS. 10a to 10d illustrate an embodiment of a safety shielding arrangement.
Figure 10B:
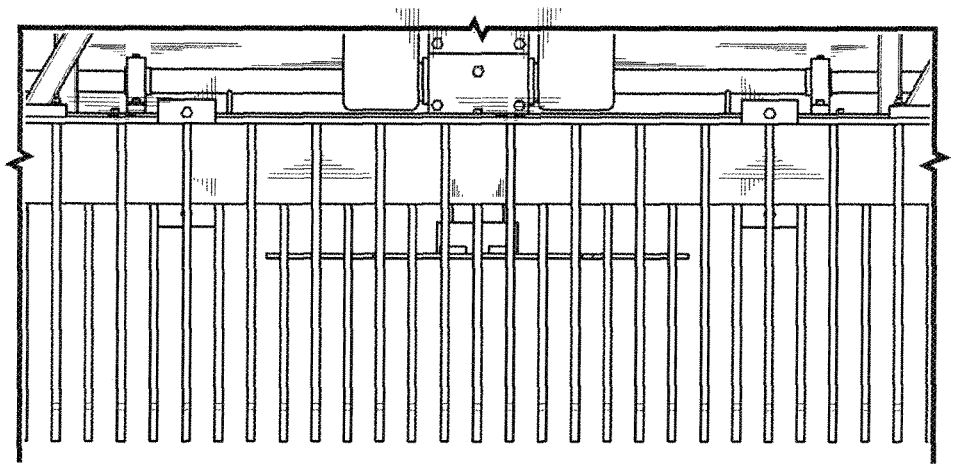
Figure 10C:
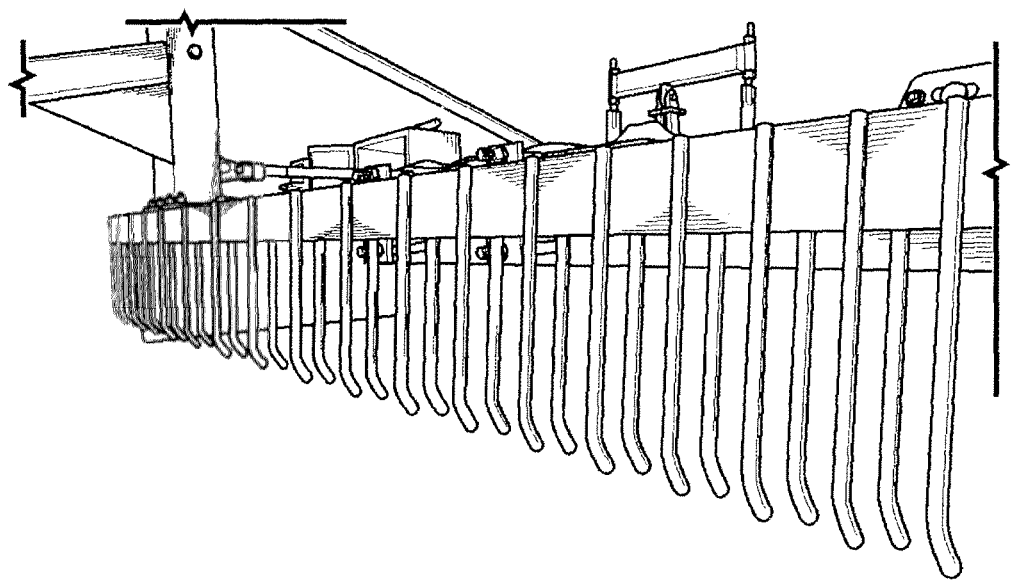
Figure 10D:
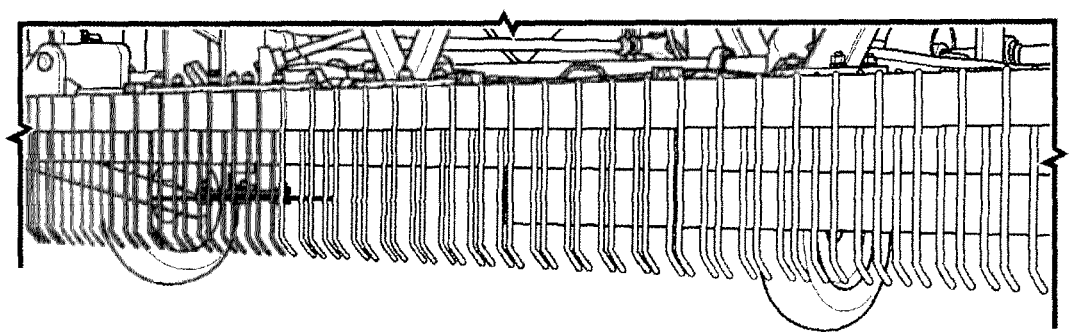

The frame 5 may be optionally provided with protective belting, as shown in the photographs in FIGS. 6a and 9a, extending 3 to 4 inches lower than the cutting blades in the event of a piece of a cutting blade breaking and being thrown off. Alternatively on the leading or trailing edges of the frame 5, in order to better avoid damage to the standing crop, protective safety shielding can take the form of an arrangement 100 as illustrated in FIG. 10a and shown in the photographs in FIGS. 10b to 10d. FIG. 10a illustrates the arrangement 100 in both top plan view and elevation view. The arrangement 100 is mounted on the frame 5 and comprises a series of vertical tines 102. As can best be seen in the top plan view of FIG. 10a, the tines 102 are provided on both the front and back of a support plate 104, staggered as illustrated. The support plate 104 is mounted on the frame 5 and extends between a right hitch plate 106 and a left hitch plate 108. The tines 102 are connected to the support plate 104, by welding or other appropriate attachment means that would be known to those skilled in the art, in such a way that a gap 110 is present between adjacent tines 102. As shown in FIGS. 10b and 10d, the tines 102 extend lower than the level of the cutting blades. In operation, then, as the frame 5 is drawn across a field and the cutting blades cut the tops of weeds, the standing crop can pass through the gaps 110 rather than be bent over by protective belting. In the event that a cutting blade becomes damaged and a piece is thrown off, the tines 102 can reduce the risk of the piece being thrown clear of the frame 5.

The front wheels 11 on the lateral and peripheral frame members 56, 57 may be provided with crop dividers to protect the crop 45, again as shown in the photographs in the Figures.

Turning now to FIGS. 1, 2, 3 and 8, the exemplary embodiment comprises PTO-driven cutting blade arrangements. Each of the cutting blades 25 are connected to an underside of the frame 5 by means of a hub assembly 24, which can be seen in the photograph of the prototype in FIG. 8. The frame 5 comprises a central frame member, lateral frame members 56 immediately adjacent the central frame member, and peripheral frame members 57 hingedly connected to the other sides of the lateral frame members 56. As can best be seen in FIG. 1, each of the five frame members has five cutting blades 25—these are shown in dashed lines at the centre and on the right side of the implement only. The cutting blades 25 are staggered, with overlap when viewed from the front of the implement, so that there is full weed-clipping coverage across the width of the implement.

A primary gearbox 26 is mounted on the central frame member, and it is driven by the PTO 2 of the tractor. The primary gearbox 26 distributes power to the other gearboxes for powering the cutting blades 25. The PTO 2 is connected to a PTO telescoping drive shaft 35 by means of a U-joint 34, and the PTO telescoping drive shaft 35 is provided with a second U-joint 36 at an opposite, rearward end. The hitch beam 4 is provided with pillow block bearings 39 for receipt of another drive shaft segment 38, which drive shaft segment 38 is connected at its forward end to the U-joint 36. The drive shaft segment 38 is provided with an alignment slot 37, which is discussed below.

The rearward end of the drive shaft segment 38 is connected to a U-joint 40, which in turn is connected to a forward end of a secondary telescoping drive shaft 41. The rearward end of the secondary telescoping drive shaft 41 is connected to a U-joint 42. The rearward end of the U-joint 42 connects to a drive shaft segment that in turn connects to the primary gearbox 26 via a sprocket coupler 33.

The primary gearbox 26, thus powered by the PTO 2 through the aforementioned series of drive shaft segments and U-joints, in turn powers a secondary gearbox 27 through a sprocket coupler 28. The secondary gearbox 27 drives the hub assembly 24 for the cutter blades 25 on the central frame member. The primary gearbox 26 also powers secondary gearboxes 55 and 62 on the lateral frame members 56 immediately adjacent the central frame member, through sprocket couplers 67 (shown in FIG. 3) and drive shafts 32 extending between adjacent frame members. These drive shafts are interrupted by U-joints at the hinge lines between adjacent frame members, as described below. Equivalent features are present on the peripheral frame members. Note that while only the right side of the implement has been described and illustrated in full in FIG. 1, the left half of the implement incorporates equivalent features.

Each secondary gearbox 27, 55, 62 powers an 11-inch triple v-belt pulley 29 to drive the hub assemblies 24. A v-belt 30 connects each 11-inch pulley 29 to a 5-inch pulley 31 on a hub assembly 24. In this way, the power from the PTO 2 is transferred through a series of shafts, U-joints and sprocket couplers to all five hub assemblies 24, thus providing power to rotate the cutting blades 24 to cut the tops of the weeds 46.

Turning now to FIGS. 1, 2, 3, 4a, 4b, 5a, 5b, 9a and 9b, the exemplary embodiment also comprises means for allowing the folding of the frame members for transport/storage. Whereas FIG. 1 illustrates the cutting assemblies on the right side of the implement, FIG. 3 illustrates the folding arrangement on the left side of the implement; this is to clearly show the various features, while all features are to be understood as being present on both sides of the implement.

The right and left lateral frame members 56 are connected to the central frame member by forward and rearward pivot connections 47, 48, to allow the frame members 56 to be folded upwardly along the connecting hinge line. As the drive shaft from the primary gearbox 26 to the secondary gearbox 55 passes across this hinge line, pivoting the adjacent frame members would damage the shaft. Therefore, the exemplary embodiment incorporates an intervening U-joint 49 at the hinge line, which when properly aligned allows for folding across the U-joint 49 without any undesired bending of the shaft. The peripheral frame members 57 are likewise provided with forward and rearward pivot connections 50, 51, with a U-joint 52 bisecting the drive shaft 53 to allow upward folding of the peripheral frame member 57 relative to the adjacent lateral frame member 56. The drive shaft 53 is connected to the secondary gearbox 55 by means of a sprocket coupler 54.

Figure 9B:
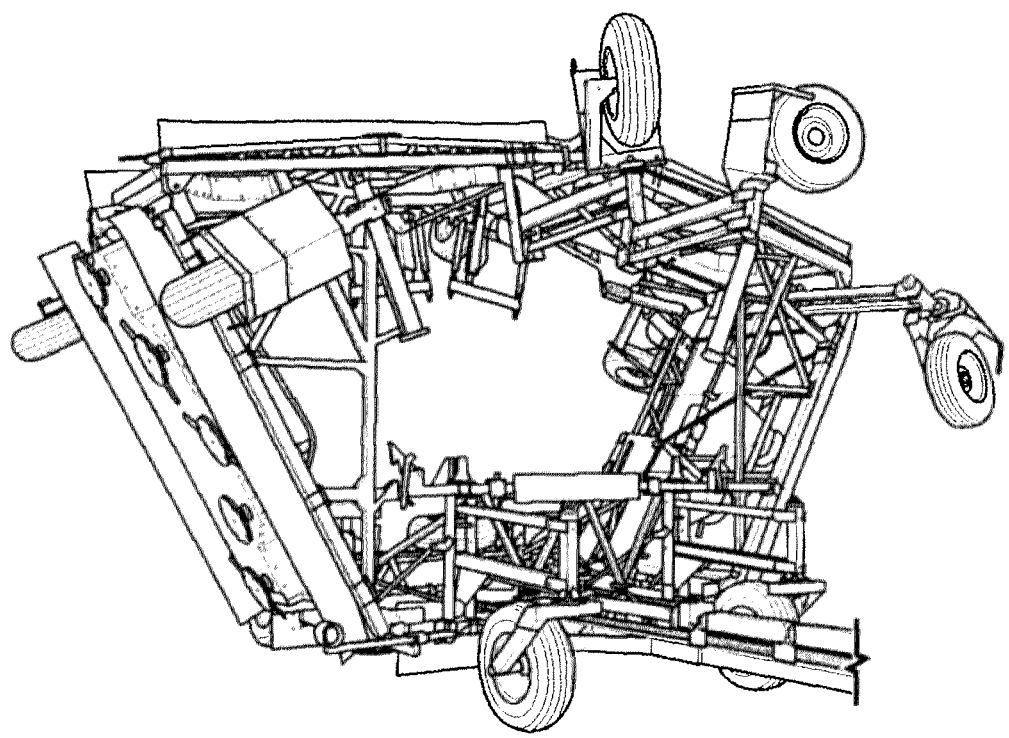

As can best be seen in FIG. 3 and the prototype photographs of FIGS. 9a and 9b, the lateral and peripheral frame members 56, 57 can be folded up and toward the centre line of the implement. This has utility in situations where the implement is being transported on a road or being stored, as it reduces the lateral extent of the implement. As indicated above, the prototype implement is approximately 50 feet wide, and road transport would not be possible without this width reduction. The frame 5 is preferably placed in the lowered position for transport. The outer ends of the implement are provided with bumpers to reduce the risk of damage when the peripheral frame members are folded into near proximity, as is shown in FIGS. 9a and 9b, and the lateral and peripheral frame members 56, 57 can optionally be pinned in place once folding is complete (thus requiring them to be unpinned before unfolding can commence). The lateral and peripheral frame members 56, 57 may also be provided with trusses for structural support.

To enable folding of the lateral and peripheral frame members 56, 57, the exemplary embodiment incorporates hydraulic cylinders 64, 66. The cylinders 64, 66 are powered by the tractor's hydraulic system, and they are pivotably connected to the frame 5 adjacent hinge lines. As can best be seen on the left side of FIG. 3, outer cylinders 66 are located adjacent the hinge line between the lateral frame member 56 and the peripheral frame member 57. Each outer cylinder 66 is pivotably connected at an inner end to a mounting bracket on the lateral frame member 56 and at an outer end to a mounting bracket on the peripheral frame member 57. Thus, when the outer cylinder 66 is actuated to retract the piston, the peripheral frame member 57 is pulled into an upward, angled orientation relative to the lateral frame member 56.

Likewise, inner cylinders 64 are located adjacent the hinge line between the central frame member and each lateral frame member 56. Each inner cylinder 64 is pivotably connected at an inner end to a mounting bracket on the central frame member and at an outer end to a mounting bracket on the lateral frame member 56. Thus, when the inner cylinder 64 is actuated to retract the piston, the lateral frame member 56 is pulled into an upward, angled orientation relative to the central frame member.

In the exemplary embodiment, the outer cylinders 66 are actuated first when folding the lateral and peripheral frame members 56, 57 to a transport/storage orientation. Once the peripheral frame members 57 are folded as shown on the left side of FIG. 3, the inner cylinders 64 are actuated to fold the lateral frame members 56, with the resulting folded orientation shown on the right side of FIG. 3 and in FIGS. 9a and 9b.

Figure 4A:
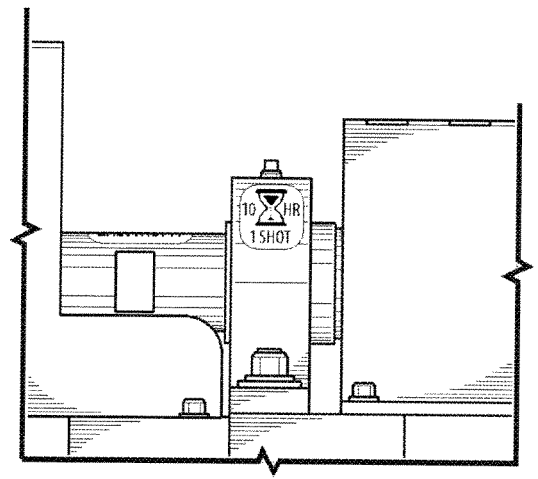
FIGS. 4a and 4b are photographs of an embodiment of the U-joint alignment means.
Figure 4B:
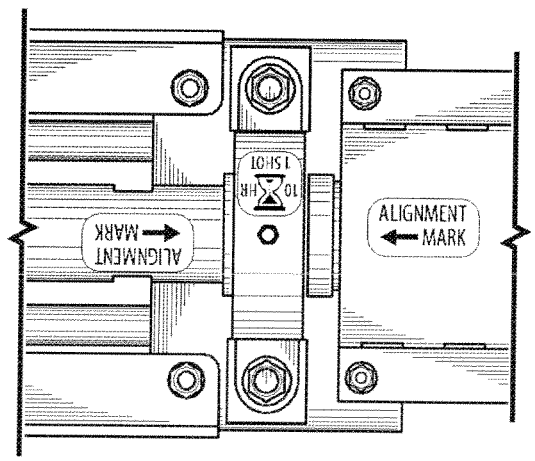
Figure 5A:
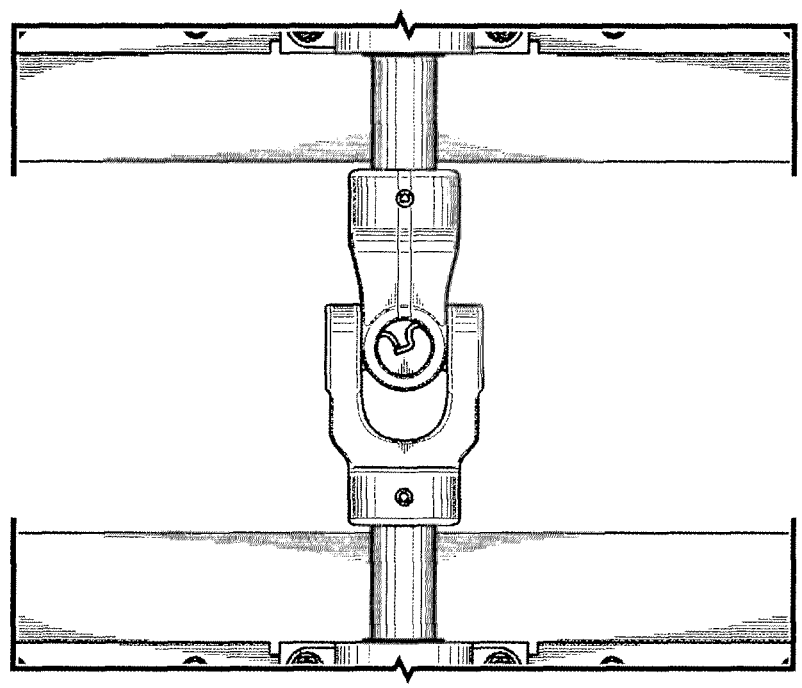
FIGS. 5a and 5b are detail photographs of an exemplary U-joint.
Figure 5B:
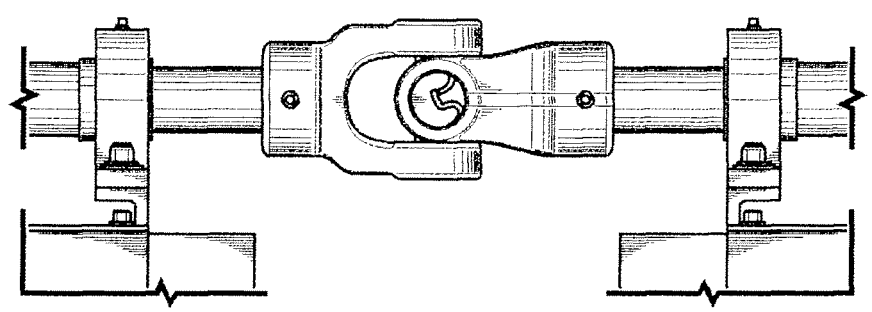

Before attempting to fold the frame members, however, it is necessary to ensure that the U-joints are properly aligned to allow folding at the hinge lines between adjacent frame members. If the U-joints are not properly aligned, for example if the pivot axes are off-horizontal (as the U-joints must fold on the same horizontal axes as the frame members), attempting to fold adjacent frame members could cause severe damage to the U-joints and/or adjacent drive shaft segments. To this end, all of the U-joints are timed for simultaneous rotation and alignment, and the drive shaft segment 38 is provided with an alignment slot 37. Turning to FIGS. 4a and 4b, the alignment slot 37 is shown as recesses on both sides of the drive shaft segment 38, configured to enable engagement by a wrench (preferably but not necessarily a 1½ inch wrench. If the U-joints are not aligned to have their axes of rotation in the horizontal, an operator would apply a wrench to the alignment slot 37 to manually rotate the drive shaft segment 38 until the alignment marks are aligned. The alignment marks are preferably applied to the implement external surface adjacent the alignment slot 37, so that an operator can rotate the drive shaft segment 38 while watching to ensure that the alignment marks align. Once the alignment marks align, the U-joints should all be in the proper orientation (i.e. horizontal pivot axis) to allow folding of the frame members. FIGS. 5a and 5b are prototype photographs showing a U-joint in the proper orientation to allow folding of the frame members.

As a further means to ensure proper alignment of the U-joints, a proximity switch can be incorporated into the hydraulic system to detect alignment of the drive shaft. If the drive shaft is not properly aligned, the proximity switch would sense that condition and deny the passage of hydraulic fluid necessary for folding. Only when the proximity switch detected proper alignment would it allow passage of hydraulic fluid necessary for folding of the frame members 56, 57.

In accordance with exemplary methods, then, an operator would first determine if weeds 46 in a particular field are higher than the average crop 45 height. If the height difference was enough to allow cutting of the weed 46 tops without harming the crop 45, the operator would haul the above-described implement (in folded orientation) to the field using a tractor. Once in or adjacent the filed, the operator would unfold the implement using the tractor's hydraulic system, by first actuating the inner cylinders 64 to lower the lateral frame members 56 to horizontal, and then by actuating the outer cylinders 66 to lower the peripheral frame members 57 to horizontal. The operator would then determine a cutting height between the crop 45 average height and the weed 46 average height. The operator would then use the tractor's hydraulic system to raise the frame 5 by actuating the cylinders 20, which would rotate the rear axles 6 and front axles 13 as described above to increase the vertical distance between the wheels 7, 11 and the frame 5.

Once the frame 5 has been raised sufficiently to position the cutting blades 25 at the desired height, the operator can direct power from the tractor's PTO 2 to drive the various shafts and belts, as described above, to rotate the cutting blades 25. With the cutting blades 25 in motion and at the desired height, the operator can drive the tractor through the field, cutting the tops of the weeds 46 while leaving the crop 45 in place.

Where the heights of the crop 45 and weeds 46 vary across the field, the operator can alter the height of the cutting blades 25 by actuating the cylinders 20. This can be done, if desired, while the tractor is in motion. The operator can repeat this weed clipping process as many times throughout the season as is necessary.

When clipping of the weeds 46 is completed, the operator can fold the frame members as described above and transport the implement back to storage.

Figure 8:
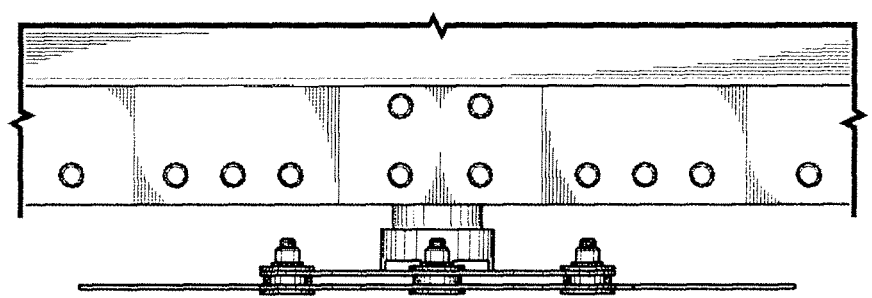
FIG. 8 is a photograph showing cutter blade detail.

There are thus numerous advantages inherent in one or more embodiments of the present invention. For example, it is not required that chemical weed treatment be applied to address the presence of weeds in a standing crop. Also, as the approach is purely mechanical, it can be repeated numerous times during the growing season, unlike some chemical treatment options. In addition, using mower blades for the cutting blades (as shown in FIG. 8) could mulch the weed tops, thus not only addressing the weed problem but adding organic material to the field to further enhance crop production while allowing greater sun access to the crop. Furthermore, mulching at the right time in weed development can also be used to prevent weed seeds from achieving maturity, thus reducing the weed competition for future crops. A further advantage of the exemplary embodiment is that the implement wheels are aligned with the wheels of the tractor, as can be seen in FIG. 1, thus reducing impact on the standing crop. Furthermore, the frame height can be adjusted throughout a field, addressing local variations in weed and crop heights. Finally, although a 50-foot implement has been described, it will be obvious to those skilled in the art that the invention could be scaled up to go as high as 150 feet in width, for appropriate applications.

As will be clear from the above, those skilled in the art would be readily able to determine obvious variants capable of providing the described functionality, and all such variants and functional equivalents are intended to fall within the scope of the present invention.

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to".
"connected", "coupled", or any variant thereof, means any connection or coupling, either direct or indirect, between two or more elements; the coupling or connection between the elements can be physical, logical, or a combination thereof "herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A foldable agricultural implement for in-crop weed clipping, the implement comprising:
    a frame comprising at least first and second frame members, the first and second frame members hingedly connected for relative rotation at a hinge line between a first weed-clipping position wherein the first and second frame members are generally horizontal and a second transport position wherein the second frame member is rotated upwardly and out of horizontal;
    at least one rotatable blade mounted on each of the frame members for clipping weeds;
    a foldable drive system for rotating the rotatable blades; and
    a plurality of ground-engaging wheels connected to the frame by at least one actuator, the at least one actuator configured to selectively raise or lower the frame relative to the plurality of wheels to position the rotatable blades at a height sufficient to clip the weeds above an average crop height;
    wherein the foldable drive system comprises:
        a drive shaft extending across the hinge line; and
        the drive shaft bisected at the hinge line by a universal joint;
    wherein the drive shaft comprises alignment means to allow rotation of the drive shaft and the universal joint to align the universal joint in a predetermined orientation when the second frame member is in the first position, and to allow folding of the drive shaft at the hinge line when the second frame member is rotated to the second position.

2. The implement of claim 1 further comprising a third frame member hingedly connected to the first frame member on a side opposite to the second frame member, the first and third frame members hingedly connected for relative rotation between a first weed-clipping position wherein the first and third frame members are generally horizontal and a second transport position wherein the third frame member is rotated upwardly and out of horizontal.

3. The implement of claim 2 further comprising:
    a fourth frame member hingedly connected to the second frame member on a side opposite to the first frame member, the second and fourth frame members hingedly connected for relative rotation between a first weed-clipping position wherein the second and fourth frame members are generally horizontal and a second transport position wherein the fourth frame member is rotated upwardly and out of horizontal; and
    a fifth frame member hingedly connected to the third frame member on a side opposite to the first frame member, the third and fifth frame members hingedly connected for relative rotation between a first weed-clipping position wherein the third and fifth frame members are generally horizontal and a second transport position wherein the fifth frame member is rotated upwardly and out of horizontal.

4. The implement of claim 1 further comprising at least one power cylinder connecting adjacent frame members and operable to rotate the adjacent frame members relative to each other.

5. The implement of claim 1 wherein each of the rotatable blades is a mower blade depending beneath the frame.

6. The implement of claim 1 wherein the foldable drive system comprises a power take-off output from a tractor, the tractor used to pull the implement through a field.

7. The implement of claim 1 wherein the foldable drive system comprises at least one gearbox, the at least one gearbox connected to the at least one rotatable blade by means of a belt, such that actuation of the gearbox causes the belt to rotate the at least one rotatable blade for clipping the weeds.

8. The implement of claim 1 wherein front wheels of the plurality of wheels are castor wheels.

9. The implement of claim 1 wherein:
    the foldable drive system comprises a primary gearbox situated on the first frame member and a secondary gearbox situated on the second frame member;

the primary gearbox is operably connected to the secondary gearbox by the drive shaft to actuate the secondary gearbox; and the secondary gearbox is connected by means of a belt to the at least one rotatable blade mounted on the second frame member, such that actuation of the secondary gearbox causes the belt to rotate the at least one rotatable blade for clipping the weeds.

10. The implement of claim 1 wherein:

the foldable drive system further comprises a primary gearbox situated on the first frame member and a secondary gearbox situated on the second frame member;

the primary gearbox is operably connected to the secondary gearbox by the drive shaft to actuate the secondary gearbox; the drive shaft comprising an inner shaft and outer shaft connected to each other by the universal joint;

the secondary gearbox is connected by means of a belt to the at least one rotatable blade mounted on the second frame member, such that actuation of the secondary gearbox causes the belt to rotate the at least one rotatable blade for clipping the weeds.

11. The implement of claim 2 wherein:

the first frame member is provided with a primary gearbox;

the third frame member is provided with a secondary gearbox operably connected by a second drive shaft to the primary gearbox of the first frame member to actuate the secondary gearbox of the third frame member; and the secondary gearbox of the third frame member is connected by means of a belt to at least one rotatable blade mounted on the third frame member, such that actuation of the secondary gearbox of the third frame member causes the belt to rotate at least one rotatable blade for clipping the weeds.

12. The implement of claim 11 wherein:

the second drive shaft comprises an inner shaft and outer shaft, the inner and outer shafts connected by a universal joint at a hinge line between the first frame member and the third frame member; and the universal joint is timed to allow rotation of the first and third frame members relative to each other.

13. The implement of claim 3 wherein:

the first frame member is provided with a primary gearbox;

the fourth frame member is provided with a fourth gearbox operably connected by a second drive shaft to a secondary gearbox of the second frame member to actuate the fourth gearbox of the fourth frame member;

the fourth gearbox of the fourth frame member is connected by means of a belt to at least one rotatable blade mounted on the fourth frame member, such that actuation of the fourth gearbox of the fourth frame member causes the belt to rotate the at least one rotatable blade for clipping the weeds;

the fifth frame member is provided with a fifth gearbox operably connected by a third shaft to a third gearbox of the third frame member to actuate the fifth gearbox of the fifth frame member; and the fifth gearbox of the fifth frame member is connected by means of a belt to at least one rotatable blade mounted on the fifth frame member, such that actuation of the third gearbox of the third frame member causes the belt to rotate the at least one rotatable blade for clipping the weeds.

14. The implement of claim 13 wherein:

each of the drive shafts comprises an inner shaft and outer shaft, the inner and outer shafts connected by a universal joint at a hinge line between the adjacent frame members; and the universal joint is timed to allow rotation of the adjacent frame members relative to each other.

15. The implement of claim 1 wherein the at least one actuator comprises power cylinders for selectively rotating the wheels away from or toward the frame to respectively raise or lower the frame relative to the wheels to position the plurality of rotatable blades at a height sufficient to clip the weeds above the average crop height.

16. The implement of claim 15 further comprising a pivot framework to maintain the frame generally parallel at a selected height.

* * * * *